United States Patent [19]

Vercoulen

[11] 4,035,077

[45] July 12, 1977

[54] COPYING APPARATUS

[75] Inventor: Johannes C. A. Vercoulen, Venlo, Netherlands

[73] Assignee: Océ-van der Grinten N.V., Venlo, Netherlands

[21] Appl. No.: 661,170

[22] Filed: Feb. 25, 1976

[30] Foreign Application Priority Data

Mar. 3, 1975  Netherlands .................. 7502462

[51] Int. Cl.² .................................. G03B 27/62
[52] U.S. Cl. ............................... 355/75; 355/25; 355/82
[58] Field of Search ............... 355/75, 25, 76, 82, 355/93, 128

[56] References Cited

U.S. PATENT DOCUMENTS

| 2,898,833 | 8/1959 | Aydlett | 355/82 X |
| 3,630,620 | 12/1971 | Fackler | 355/76 |
| 3,642,376 | 2/1972 | Halvorsen et al. | 355/82 X |
| 3,953,124 | 4/1976 | Kolibas | 355/25 X |
| 3,989,376 | 11/1976 | Ravera et al. | 355/75 |
| 3,997,265 | 12/1976 | Menon et al. | 355/75 |

FOREIGN PATENT DOCUMENTS 1,339,746  9/1963  France .................. 355/82

Primary Examiner—Richard A. Wintercorn
Attorney, Agent, or Firm—Albert C. Johnston

[57] ABSTRACT

A cover device for pressing originals having different thicknesses with equal force against a glass exposure plate of photocopying apparatus comprises a bordering frame swingable between closed and open positions and, inside the frame, a platelike covering member which rests upon supporting elements of the frame when the frame is in open position, presses down upon an original on the exposure plate yet is displaced according to the thickness of the original as the frame is moved to closed position, and is guided from displaced positions to rest again upon said supporting elements as the frame is moved from closed to open position.

9 Claims, 6 Drawing Figures

COPYING APPARATUS

This invention relates to a copying apparatus and particularly to improvements of a known kind of exposure covering device that comprises a cover to overlie a generally horizontal glass plate on which an original to be copied can be laid down and a mechanism for movably connecting the cover with the frame of the copier so that the cover is movable between an open position and a closed position in which it covers the glass plate and presses on an original laid down on the plate.

In a known device of that kind, as described in U.S. Pat. No 3,642,371, the cover is formed by a rectangular box which is open at one side and has mounted in the open side an elastic membrane with which the original is pressed against the glass plate.

That known device is disadvantageous, on the one hand, in that the force with which the original is pressed against the glass plate, and consequently the flatness of the original, varies with the thickness of the original and consequently is the smallest for the sheetlike originals which are most commonly used in practice. On the other hand, the thickness of the original is limited by the height of the box and the maximally available extension of the membrane.

The object of the present invention is to provide a device of the kind above mentioned by which the disadvantages of the said known device are avoided.

According to the invention, this object is attained by the provision of a cover arrangement in which the cover comprises a first part provided with supporting elements and connected with the motive mechanism, a second part of platelike form which in the open position rests on the supporting elements of the first part, in the closed position rests on the original and presses it downward and, depending upon the vertical dimension of the original, is thereby displaced relative to the first part, and guides by which the second part is always returned into the same position on the supporting elements when the cover is brought from the closed position into the open position.

In this arrangement, the force with which an original is pressed against the glass plate is constant and is equal to the weight of the second part, yet when so desired this force can be increased manually. Moreover, the device affords considerably widened latitude for copying originals having different thicknesses.

The above mentioned first part preferably is in the form of a U-shaped or rectangular raised border, or frame, and the second part of a generally rectangular plate fitting inside the frame, and the guides are formed by raised inner edges of the frame or the plate. In this way, the height of the cover need be not greater than the thickness of the thickest original to be used, and the emission of light outside the cover is reduced to a minimum.

According to a preferred embodiment of the invention, the inner perimeter of the bordering frame is connected with the perimeter of the plate by a light-screening bellows. By virtue of this construction, the height of the plate and frame may be very small, even smaller than the thickness of the thickest original, and still during the copying no light is emitted outside of the covering device.

The above mentioned and other features and advantages of the invention will become clear from the following description and the accompanying drawings of an illustrative embodiment of the invention. In the drawings.

Figure 1:
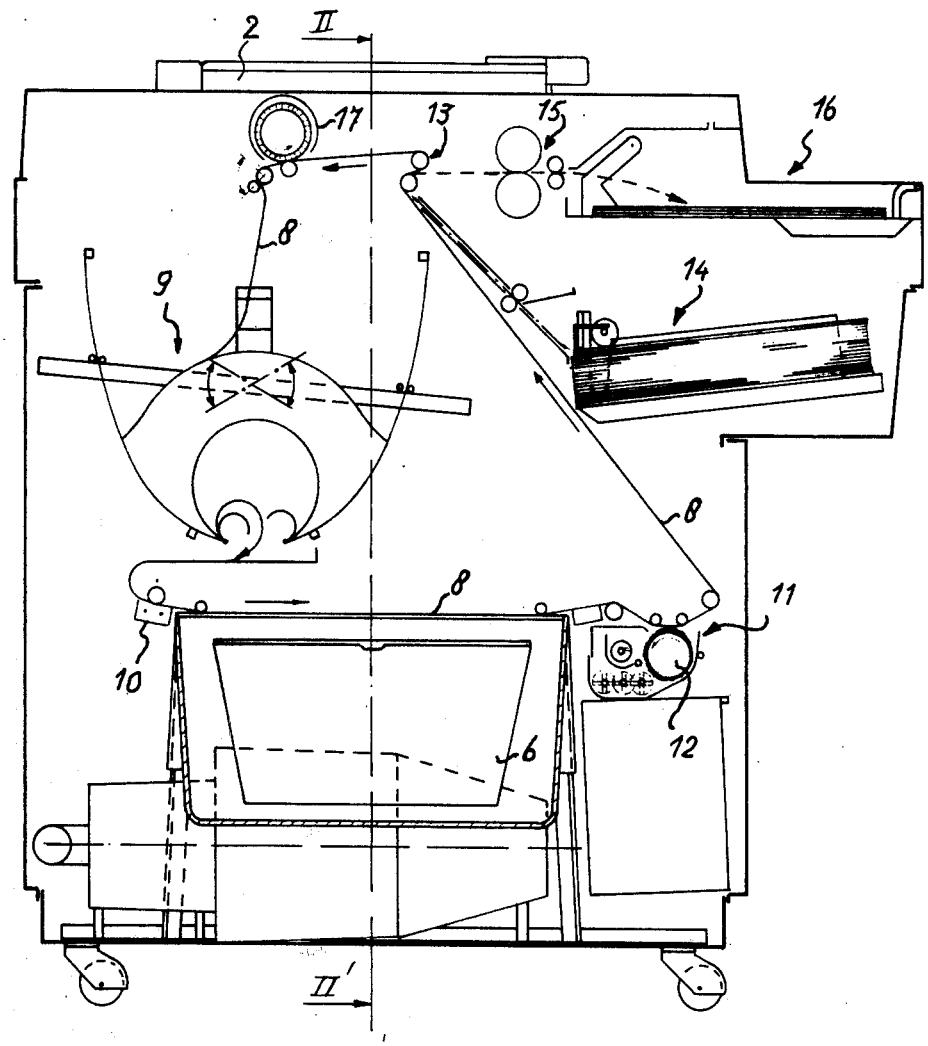
FIG. 1 is a schematic representation, partially in section, of an electrophotographic copying apparatus provided at the exposure plate with a cover device according to the invention.
Figure 2:
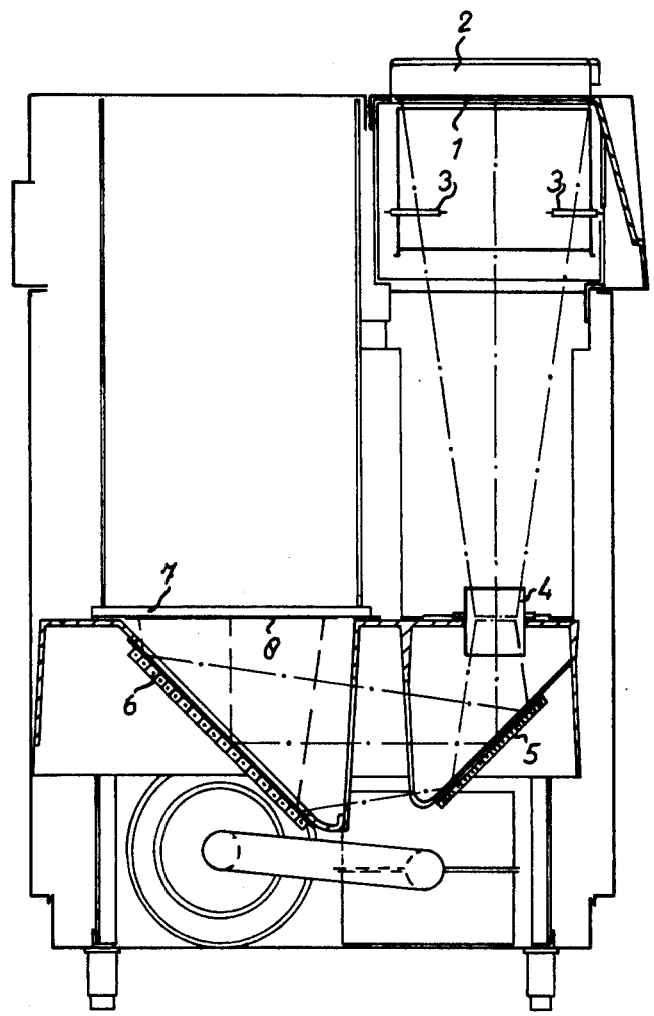
FIG. 2 is a schematic sectional view of that apparatus taken along line II—II' of FIG. 1.
Figure 3:
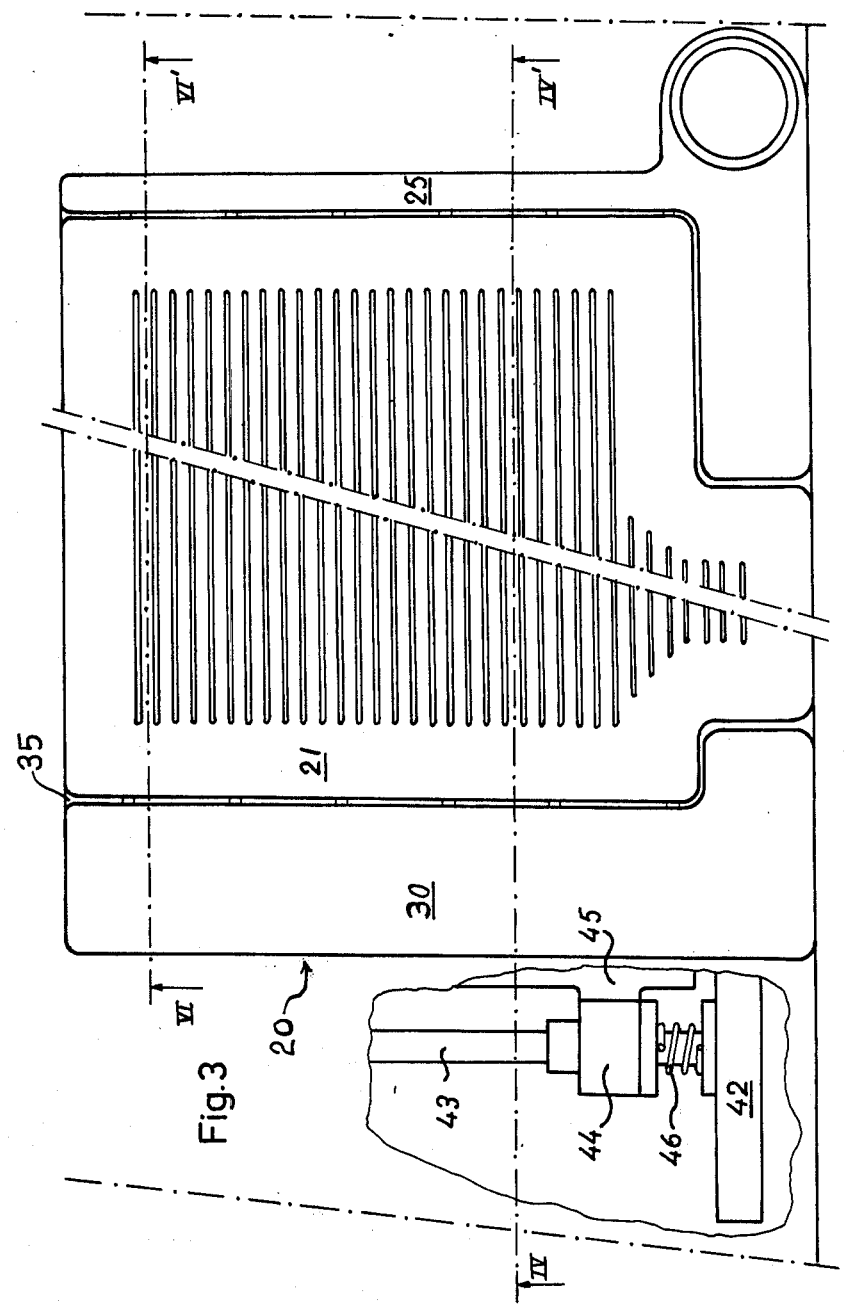
FIG. 3 is a plan view, partly broken away, of the cover device.

For a description of the copying apparatus schematically represented in FIGS. 1 and 2, which is one of many forms of electrophotographic copying apparatus with which the present invention can be used, reference is made to U.S. Pat. No. 3,926,625 issued Dec. 16, 1975. In general, in this apparatus, as also in other electrostatic copying systems, an image of the original to be copied is projected onto the sensitized surface of an electrophotographic imaging member so as to form an electrostatic latent image thereon, and this latent image is developed by applying to it an oppositely charged toner powder which forms a visible powder image corresponding with the charge pattern of the latent image. Subsequently the powder image is transferred onto a receiving material, on which it is fixed, as by being fused thereto, in order to obtain a permanent copy.

In the illustrated apparatus, an original to be copied is laid upon a transparent glass exposure plate 1 (FIG. 2), which is firmly mounted in the housing of the machine. The original is pressed down against the glass plate 1 by a cover device having boxlike form, after which the original is exposed by means of flash lamps 3. The image reflected by the original is projected via an optical system, comprising a lens 4 and mirrors 5 and 6, onto a portion of the photosensitive surface of an imaging medium, or electrophotographic plate, which in this case is formed as an endless belt 8 and has the portion thereof being exposed present in an image projection plane 7.

The endless belt 8 is transported in the apparatus via a number of rollers and via a magazine 9, all as described more particularly in U.S. Pat. No. 3,756,488, issued Sept. 4, 1973, so that when copies are to be made the belt can be moved with a constant speed in the direction of the arrows. During this movement the reflected image of an original is projected onto the electrophotographic surface of the belt, which has been charged in advance by means of a corona discharging device 10. By the projection of the image the photoconductive layer is discharged in the areas struck by the light, so that a latent electrostatic image corresponding with the original is produced on the belt. Upon further movement of the belt, the latent electrostatic image passes a developing station 11 in which developing powder is brought into contact with the belt surface by means of a so-called magnetic brush 12, in order to develop the latent image and convert it into a powder image.

The powder image is transported by the belt to a transfer station 13, in which a sheet of copy paper is moved against and along with the belt at the speed of the belt and the powder image is transferred to the sheet of copy paper. Sheets of copy paper can be transported to the belt individually and successively from a sheet feeding unit 14 installed adjacent to the transfer station.

The copy sheet receiving the powder image is separated from the belt 8 and passed through a fusing unit 15 in which the transferred powder image is fixed to the sheet of copy paper, after which the sheet is transported to a receiving tray 16 accessible from outside the apparatus.

Any portion of the powder image which is not transferred onto the sheet of copy paper is carried on the belt 8 beyond the transfer station and then along a cleaning device 17 by which the remnants of powder are removed.

The copying apparatus further comprises suitable drive means and control means for driving the belt 8 in timed relationship to the flash exposure of an original to be copied, for separating and supplying sheets of copy paper and transporting them through the transfer station 13, and for transporting each imaged copy sheet through the fusing unit 15 to the receiving tray 16.

As illustrated in FIGS. 3–6, the cover device according to a preferred embodiment of the invention comprises a generally U-shaped frame 20, which is connected pivotably with a support in an upper portion of the copying apparatus, and a platelike covering member 21 situated within the U-shaped frame 20.

The frame 20 includes a leg 25 shown at the right in FIGS. 3–6, a leg 30 shown at the left, and a connecting wall 35 between these legs at the back side of the frame. The leg 25 is a profile having a flange 26 directed inward at the lower side and having a raised edge 27 at the top, between which a substantially horizontal shoulder 28 is formed. The leg 30 is a profile having a flange 31 directed inward at the lower side and a raised top portion 32, between which a substantially horizontal shoulder 33 is formed opposite to the shoulder 28 of leg 25. The connecting wall 35 is rectangular in section and has near its lower side a flange 36 which is directed inward (see FIG. 5) from wall 35, which wall extends to an upper edge 37 at the same level as the shoulders 28 and 33.

Figure 4:
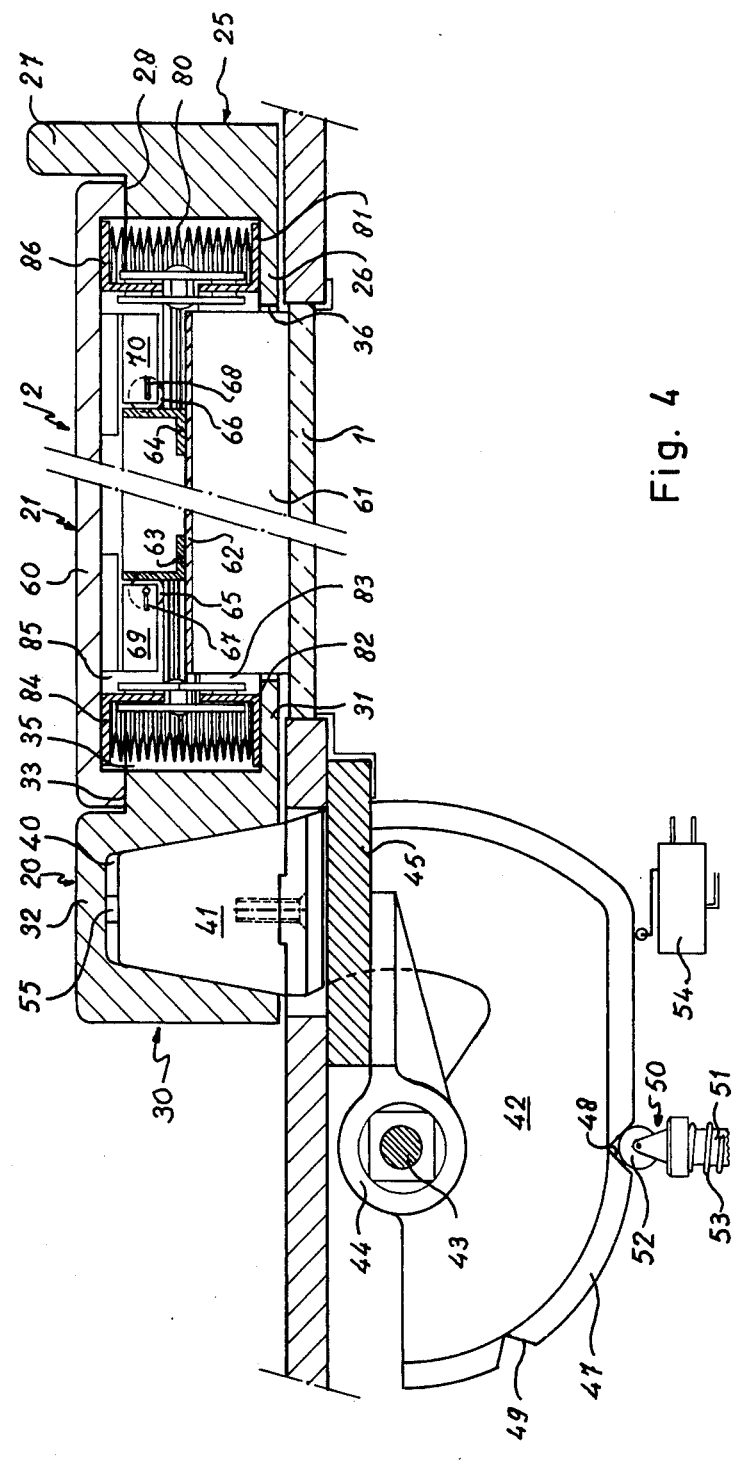
FIG. 4 is a cross section taken along line IV—IV' of FIG. 3, showing the parts as they are positioned when no original or only a sheetlike original has been laid on the exposure plate.

The leg 30 is provided with a recess 40 (FIG. 4) opening into it from its lower side and extending over almost its entire length. This recess fits over a wedge-like bar 41 to which the leg 30 is connected by bolts 55, one of which is shown in FIG. 4. The bar 41 is connected with two discs 42, one near the front of the cover device (see FIG. 3) and one near the back (see FIG. 4). Each disc 42 is fixed to a common shaft 43 which is rotatable in two bearing supports 44 mounted on a stationary part 45 of the frame of the copying apparatus. Each disc 42 is connected with the bearing support nearest to it by a torsion spring 46, so that the torsion springs will counterbalance the weight of the cover device 2.

At least one of the discs 42 has a thickened peripheral edge 47 in which two notches 48 and 49 are provided. This edge cooperates with a holding mechanism 50 comprising a pin 51 having a small roller 52 mounted rotatably thereon, which pin is pressed toward the disc 42 by a spring 53. The notches 48 and 49 are so located that in the closed position of the cover the small roller 52 is pressed into notch 48 and in the open position of the cover, in which the cover stands at an angle to the glass plate 1, the small roller is pressed into notch 49. The shape of the notches 48 and 49 and the pressing force of the spring 53 are selected so that, when no external force is acting on the cover, the cover is held in a fixed position by the cooperation of the roller 52 with the notch 48 or 49, but the roller 52 is pressed out of the notch 48 or 49 by applying a small external force to the cover. If so desired, a microswitch 54 can be provided to cooperate with the edge 47 so that the microswitch 54 will prevent lamps from being switched on to effect an exposure if the cover is not in its closed position.

The covering member 21 as shown comprises a substantially rectangular plate 60 which fits between the raised portions 27 and 32 of the frame legs 25 and 30 and, when the cover device 2 is in open position, rests with its edges lying on the shoulders 28 and 33 and the upper edge of wall 35. A body member 61 for pressing down upon an original is connected detachably with the lower side of the plate 60. The pressing body 61, for instance, is a rectangular piece of foamlike or homogeneously elastic plastic, which is provided with a white reflecting layer over its lower face.

In the embodiment shown, the detachable connection between the pressing body 61 and the plate 60 is constituted as follows: The pressing body 61 has a metal plate 62 connected with it, forming a rigid layer on its upper side. Two L-shaped profiles 63 and 63 are fixed to the upper side of the plate 62. Each of these profiles has a number of openings, for instance two, in its upright flange in position to be engaged by portions of the periphery of small rollers 65 and 66. The small rollers 65 and 66 have journals held in slots 67 and 68 formed in spaced-apart upright flanges of U-shaped profiles 69 and 70, the bases of which are fixed against the lower side of the plate 60 via spacing pieces 71 and 72. A small spring (not shown) in each profile 69 or 70 presses each small roller 65 to the right, and presses each small roller 66 to the left, as viewed in FIG. 4.

By this construction, it results that in normal working conditions the pressing body 61 is firmly connected with the plate 60, but by exerting a pulling force on the pressing body 61 relative to the plate 60 the openings in profiles 63 and 64 are easily displaced off the rollers 65 and 66 for severing the connection. This is beneficial, for instance, in order to clean or to replace the pressing body 61, after which the cleaned pressing body or another of the same form can easily be fixed in place by simply pushing it into the structure under the cover member.

In order to assure a light-proof covering of the exposure plate in all uses of the cover device according to the invention, the frame 20 and the covering member 21 are interconnected by a bellows 80 which in plan view is U-shaped. The lower edge of the bellows 80 is connected via profiles 81, 82 and 83 with the inwardly directed flanges 26, 31 and 36 of the frame 20, whereas the upper edge of the bellows 80 is connected with the lower side of the plate 60 via L-shaped profiles 84, 85 and 86. In this way a light-screening connection is made along three sides between the frame 20 and the covering member 21. At the front or fourth side a covering plate may be connected pivotally with the plate 60 so that, at this side also, as little light as practicable will be able to escape. This fourth side corresponds with the side edge of the glass plate 1 on which the nip of a book is placed when copies are to be made from a book, part of the book then hanging out of the apparatus in a manner such that it already partially screens off the emission of light.

Figure 6:
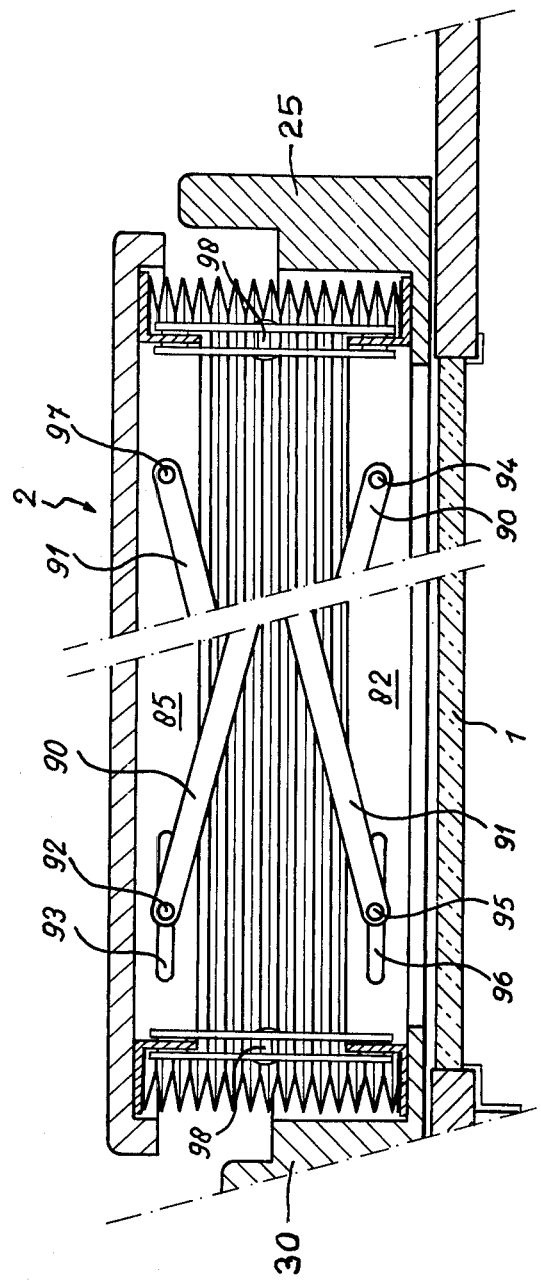
FIG. 6 is a cross section taken along line VI-VI' of FIG. 3.

In the illustrated embodiment, the connection between the frame 20 and the covering member 21 is further improved by the provision of three scissor linkages, one for the back wall and each leg of the frame 20. Each of these linkages (see FIG. 6) comprises two links 90 and 91. For the back wall, for instance, the link 90 is movably connected at one end with the L-shaped profile 85 via a pin 92 slidable in a slot 93, and its other end is connected pivotably with the L-shaped profile 82 by a pin 94. The link 91 similarly is connected at one end slidably with the L-shaped profile 82 via a pin 95 and a slot 96, and at the other end pivotably with the profile 85 via a pin 97. The centers of the links 90 and 91 are interconnected pivotally, for instance by a bushing 98 as shown in FIG. 6 for the scissor linkages along the frame legs.

Figure 5:
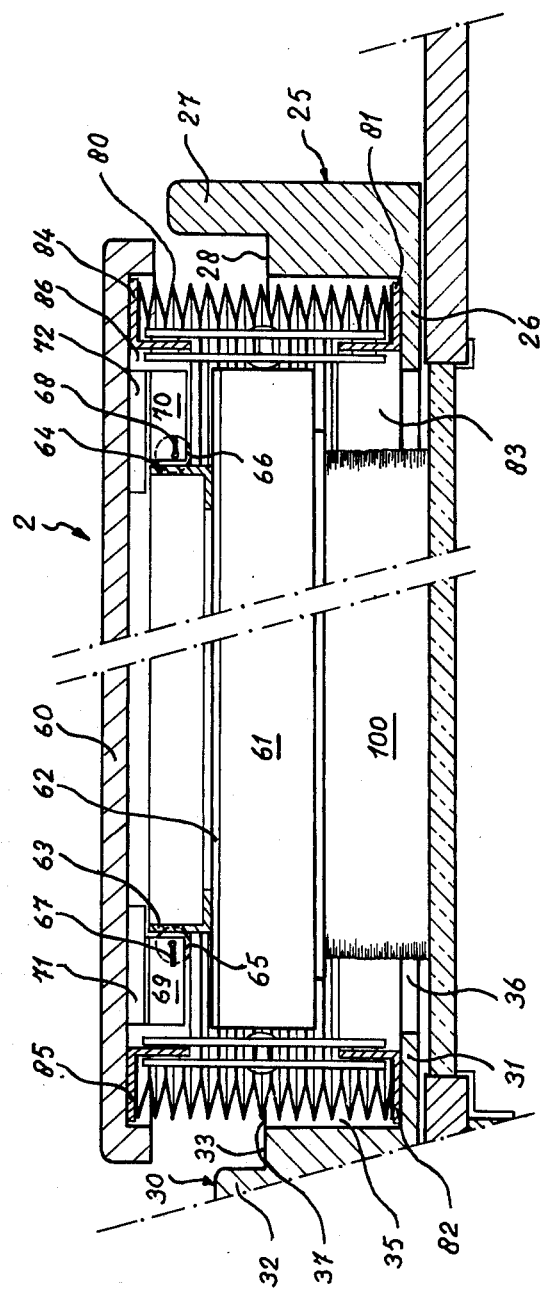
FIG. 5 is a cross section similar to a part of FIG. 4, but showing the position of the parts when a booklike original has been laid on the glass plate.

The manner of operation and use of the cover device according to the invention is as follows: When the cover device is in open position, it forms an angle of, for instance, 60° with the glass plate, corresponding to the angular distance between the notches 48 and 49 shown in FIG. 4. In this position, the covering member 21 rests via the edges of plate 60 on the shoulders 28 and 33 and the upper edges 37 of wall 35, and via the bellows 80 and the scissor linkages on the inwardly directed flanges 26, 31 and 36. If no original or only a sheetlike original lies on the glass plate 1, the relative position of the frame and the covering member hardly changes during the closing of the cover, but when the cover is closed the pressing body 61 exerts against the plate 60 a downward force determined by the weight of the entire covering member 21. When a thicker original 100 has been laid down on the glass plate 1, as represented in FIG. 5, the pressing body 61 cannot sink down onto the glass plate during the closing of the cover, but is held up by the original 100, as is the plate 60, so that the entire covering member becomes displaced upwardly relative to the frame and occupies a position in which, to an extent varying with the thickness of the original, the bellows 80 are partially extended. The thicker original will be pressed down on the glass plate with the same force as in the case of a sheetlike original. The bellows 80 also prevents the operator from being hindered by any emission of light.

It will be evident that the invention is not restricted to the embodiment described and illustrated in the drawings and that numerous modifications can be made without departing from the basic concepts herein disclosed. For instance, the upper face as well as the lower face of the pressing body 61 can be provided with a white reflecting surface and this element can be designed so that it can be fixed in place with either of its faces directed toward the plate 60. Thus, when in course of time one of the faces of the pressing body 61 has become dirty and can no longer be cleaned properly, the pressing body can simply be reversed, enabling the operator to work again with a clean pressing face. For such a case, for instance, the pressing body 61 and the plate 60 may be connected together via the side edges of the pressing body.

What is claimed is:

1. In a copying apparatus including a substantially horizontal transparent plate to support an original for exposure, a cover device for said plate, and means connected with said cover device whereby it is movable between an open position in which an original may be laid upon said plate and a closed position in which said device covers said plate and presses down upon the original, the improvement wherein said cover device comprises a bordering frame connected with said motive means and a platelike covering member arranged inside said frame to rest and press down upon the original when said frame is in closed position, said frame having thereon supporting elements upon which said covering member rests when said frame is in open position, said covering member being displaceable vertically relative to said frame by and according to the thickness of the original as said frame is moved to closed position, and means for guiding said covering member from vertically displaced position thereof to its position on said supporting elements as said frame is moved from closed to open position.

2. Apparatus according to claim 1, said covering member comprising a substantially rectangular cover plate having an elastically compressible body mounted onto its under side and fitting within said frame for pressing down on the original.

3. Apparatus according to claim 2, said guiding means comprising raised edge portions of said frame coacting with edge portions of said cover plate.

4. Apparatus according to claim 3, said supporting elements comprising at least one inwardly directed ledge on said frame to support an edge of said cover plate between a raised edge portion of said frame and the base thereof.

5. Apparatus according to claim 1, said guiding means comprising scissor linkages the respective links of which are connected pivotably at one end thereof and slidably at their other end with flanges fixed respectively to said frame and said covering member.

6. Apparatus according to claim 2, the height of said covering member being substantially equal to the height of said frame.

7. Apparatus according to claim 2, and a light-screening bellows extending vertically between an inner perimeter of said frame and the under side of said cover plate.

8. A cover device for a substantially horizontal transparent exposure plate of a copying apparatus, adapted to be moved between an open position in which an original to be copied may be laid upon said plate and a closed position in which the device covers said plate and presses down upon the original, said device comprising a bordering frame adapted to be connected with means whereby it is swingable between said positions and a platelike covering member arranged inside said frame to rest and press down upon the original when said frame is in closed position, said frame having thereon supporting elements upon which said covering member rests when said frame is in open position, said covering member being displaceable vertically relative to said frame by and according to the thickness of the original as said frame is moved to closed position, and means for guiding said covering member from vertically displaced positions thereof to its position on said supporting elements as said frame is moved from closed to open position.

9. The cover device according to claim 8, said covering member comprising a substantially rectangular cover plate having an elastically compressible body mounted onto its under side and fitting within said frame for pressing down on the original, the height of said covering member being substantially equal to the height of said frame, said supporting elements comprising at least one inwardly directed ledge on said frame to support an edge of said cover plate between a raised edge portion of said frame and the base thereof, said guiding means comprising scissor linkages the respective links of which are connected pivotably at one end thereof and slidably at their other end with flanges fixed respectively to said frame and said covering member, and a light-screening bellows extending vertically between an inner perimeter of said frame and the under side of said cover plate.

* * * * *